(12) United States Patent
Sheymov et al.

(10) Patent No.: US 7,406,713 B2
(45) Date of Patent: Jul. 29, 2008

(54) SYSTEMS AND METHODS FOR DISTRIBUTED NETWORK PROTECTION (75) Inventors: Victor I Sheymov, Vienna, VA (US); Roger B Turner, Laurel, MD (US)

(73) Assignee: Invicta Networks, Inc., Herndon, VA (US)

( * ) Notice: Subject to any disclaimer, the term of this patent is extended or adjusted under 35 U.S.C. 154(b) by 724 days.

(21) Appl. No.: 09/925,503

(22) Filed: Aug. 10, 2001

(65) Prior Publication Data
US 2002/0023227 A1 Feb. 21, 2002

Related U.S. Application Data (60) Provisional application No. 60/226,088, filed on Aug. 18, 2000.

(51) Int. Cl.
G06F 21/00 (2006.01)

(52) U.S. Cl. ..................................... 726/23
(58) Field of Classification Search .............. 713/200; 379/44; 726/22–23
See application file for complete search history.

(56) References Cited

U.S. PATENT DOCUMENTS

| 5,550,551 | A | | 8/1996 | Alesio | |
|---|---|---|---|---|---|
| 5,694,335 | A | | 12/1997 | Hollenberg | |
| 5,796,952 | A | | 8/1998 | Davis et al. | |
| 5,825,283 | A | | 10/1998 | Camhi | |
| 5,864,683 | A | * | 1/1999 | Boebert et al. | 709/249 |
| 5,969,433 | A | | 10/1999 | Maggiora et al. | |
| 6,275,942 | B1 | * | 8/2001 | Bernhard et al. | 713/201 |
| 6,363,489 | B1 | * | 3/2002 | Comay et al. | 726/22 |
| 6,405,318 | B1 | * | 6/2002 | Rowland | 713/200 |
| 6,519,703 | B1 | * | 2/2003 | Joyce | 713/201 |
| 6,735,702 | B1 | | 5/2004 | Yavtkar et al. | |
| 6,738,909 | B1 | * | 5/2004 | Cheng et al. | 713/201 |
| 6,748,540 | B1 | | 6/2004 | Canestaro et al. | |
| 6,886,102 | B1 | * | 4/2005 | Lyle | 726/23 |
| 6,981,146 | B1 | | 12/2005 | Sheymov | |

(Continued)

FOREIGN PATENT DOCUMENTS

WO        WO 00/42742        7/2000

(Continued)

OTHER PUBLICATIONS

PCT (PCT/US01/41654) International Search Report date of mailing Jul. 10, 2002.

(Continued)

Primary Examiner—Emmanuel L Moise
Assistant Examiner—Jeffrey D Popham
(74) Attorney, Agent, or Firm—Roberts Mlotkowski Safran & Cole, P.C.

(57) ABSTRACT

Through the use of an intermediate party, a first party is given the ability to communicate with a second party, with the communication appearing as if it originated with the intermediate party. Specifically, in a protected network system, the protected network is capable of acting as a conduit through which an entity, such as law enforcement, can communicate with an entity attempting an unauthorized access attempt unbeknownst to the entity attempting the unauthorized access attempt. This allows, for example, the detection and identification of the entity attempting the unauthorized access attempt.

55 Claims, 6 Drawing Sheets

U.S. PATENT DOCUMENTS 6,990,591 B1 * 1/2006 Pearson .................. 726/22
2002/0023227 A1 2/2002 Sheymov et al.

FOREIGN PATENT DOCUMENTS

WO     WO 01/84270     11/2001
WO     WO 01/95590     12/2001

OTHER PUBLICATIONS

Dahlia Malkhi, et al.; "Secure Execution of Java Applets Using a Remote Playground"; AT&T Labs Research, Florham Park, NJ; 1988 IEEE; pp. 40-51.

John Pescatore; "Secure Use of the World Wide Web: Keeping Browsers and Servers From Getting Snared"; Trusted Information System; ISBN# 0-7803-3277-6; pp. 36-39.

RSA Security; "Are Passwords Really Free? A Closer Look at the Hidden Costs of Password Security"; pp. 1-8.

White G. B. et al. *"Cooperating Security Managers: A Peer-Based Intrusion Detection System"* IEEE Network, IEEE Inc. New York, US, vol. 10, No. 1, 1996, pp. 20-23, XP000580083, pp. 20-23.

Talpade R., Kim G., Khurana S.: *"NOMAD: Traffic-based Network Monitoring Framework for Anomaly Detection"* Proceedings IEEE International Symposium On Computers And Communications, Jul. 6-8, 1999, pp. 442-451.

* cited by examiner

SYSTEMS AND METHODS FOR DISTRIBUTED NETWORK PROTECTION

RELATED APPLICATION DATA

This application claims benefit of U.S. Provisional Application Ser. No. 60/226,088 entitled "Cyber Hacking Unauthorized Access Attempt Tracing and Retaliation Methods and Systems" filed Aug. 18, 2000, and is related to U.S. patent application Ser. No. 09/867,442 entitled "Systems and Methods for Distributed Network Protection" filed May 31, 2001 both incorporated herein by reference in their entirety.

BACKGROUND OF THE INVENTION

1. Field of the Invention

In general, the systems and methods of this invention relate to protecting distributed networks. In particular, the systems and methods of this invention relate to protecting distributed networks through an intrusion detection and analysis system.

2. Description of Related Art

The nation's information infrastructure, based a large part on the Internet, has become an integral part of normal business and is becoming critical to the national security of many countries. The intrusion into public and private networks by unauthorized individuals is a major problem for many entities. Foreign powers, and a variety of hackers, i.e., individuals or entities who attempt to obtain unauthorized access to one or more networks, or portions of networks, to, for example, obtain information, continue to develop systems and methods that, for example, interrupt communications, damage files, damage computer network systems, gain access to private information, and the like. Many tools, such as firewalls, passwords and network security schemes have been developed in an attempt to provide protection to various aspects of distributed networks.

SUMMARY OF THE INVENTION

The recent increase in frequency, intensity and sophistication of unauthorized access attempts combined with their potential power warrant not only protective efforts, but also implementation of a technology capable of tracing and possible retaliatory responses to such unauthorized access attempts. For example, it becomes a particularly important issue in regard to unauthorized access attempts on military computer systems and systems maintaining sensitive data. The importance of such a technology is amplified by the notion that, for example, the ability to perform tracing and retaliation should become a substantial deterrent for launching the unauthorized access attempts in the first place.

Existing systems and methods are not particularly effective to a large extent because of their retrospective nature. In particular, most existing systems and methods employ difficult and labor intensive investigative techniques that provide a history of the unauthorized access attempt. Furthermore, tracing an origin of a an unauthorized access attempt, i.e., a hack, after the attempt has ended becomes difficult with the increasing sophistication of the hackers who employ effective techniques to conceal their identities and camouflage the origin of the unauthorized access attempt.

One of the exemplary problems associated with finding the hacker is the generally indirect nature of the unauthorized access attempt. Usually a hacker will traverse through several hosts using them as conduits through which unauthorized access attempts are launched. The systems and methods of this invention are capable of detecting an unauthorized access attempt in real-time or near real-time and can then, for example, engage the hacker in a series of transactions through the conduits from the target to the original source of the hacker. Some of the exemplary steps needed for successful identification of the origin of the unauthorized access attempt are the detection, verification and information exchange with the hacker using, for example, embedded flags or a concealed program having a predetermined function.

As discussed above, the origin of a unauthorized access attempt can be most effectively traced in real-time or near real-time, i.e., during the course of the unauthorized access attempt. While hackers often use various methods to disguise the real origin of the unauthorized access attempt, there is still at least one fundamental requirement for any unauthorized access attempt to succeed that can be used for tracking its origin. Indeed, except for denial of service unauthorized access attempts, hacking by its very nature requires that the target system's response to unauthorized access attempting packets be received by the hacker directly or indirectly. This means that no matter how sophisticated any disguise mechanism is, the hacker has to make itself available to receive such a response. This premise can be used effectively for tracing an unauthorized access attempt.

Unauthorized access attempt tracing can be performed, for example, autonomously, i.e., by one or more entities without implementing general surveillance over the internet. In this case, when an unauthorized access attempt is detected and confirmed as a hostile act, a concealed program can be embedded in the response to the origin of the unauthorized access attempt. Then, for example, when the hacker receives the target station's response, a concealed program could act as a "worm" within the one or more computers from which the unauthorized access attempt originated. For example, the program, such as a Java® script, or other executable program, could cause the unauthorized access attempting station to validate the hostile attempt and, if the attempt is confirmed, secretly forward the real identification, such as an IP address, to the target station or some other predetermined destination(s).

In other words, for example, in the case of an HTML page being sent as a response to an unauthorized access attempt, the page can contain an executable program which could be invisible to the hacker. Additionally, a disguised request for confirming hostile intent could be included in such an HTML page. For example, if the target system does not employ a "user ID" feature, a fake request for such a user ID could be made. By the act of attempting to enter a user ID, a hacker confirms they are not familiar with the target system and that they are trying to enter the system in an unauthorized manner. The concealed program could then, for example, be triggered if a hacker enters any user ID. This concealed program could then instruct the hacker's computer, for example, to forward information regarding the hacker to a predetermined destination, such as a pre-programmed IP address. This information could then be forwarded, for example, to a law enforcement or other entity as appropriate.

In some instances, the autonomous method as described above may not produce the desired result. In such instances, a more complex method, for example, involving cooperative reporting systems can be used. This cooperative reporting system could require full cooperation between, for example, the national information infrastructure systems, and for example, the private and government information technology communities. Using this method, a target station, having confirmed an unauthorized access attempt, can include a flag concealed in the response to the hacker. Then, participating nodes and conduit hosts throughout the distributed network will be supplied and updated with information relating to the unauthorized access attempt so that the participating nodes and conduit hosts can detect the passage of the flag and forward information regarding the passage of the flag to a predetermined destination. This way, even though a hacker may have removed the origin the unauthorized access attempt several steps from the target by using, for example, intermediate computing systems, the hacker still would need to receive the packet. In other words, no matter how many intermediate steps the hacker uses, or what method of communication is used, the flag packet would still reach the hacker and could trigger reporting highlighting the path to the hacker. In fact, the more steps the hacker takes to disguise the origin, the more the hacker increases the chance of detection through exposure at multiple nodes and/or conduits between the target and the origin of the unauthorized access attempt.

These two methods, when used in conjunction, can cover a broad spectrum of hacks. The long-range, i.e., multiple node traversed, unauthorized access attempts with many hops are vulnerable to flag detection at intermediate nodes, while closer range unauthorized access attempts are more vulnerable to direct detection. The systems and methods discussed herein at least overcome the need for general surveillance, which could be very difficult to perform and may compromise privacy in that all packets would be scanned. Specifically, a general surveillance system would analyze packets flowing through one or more internet nodes in an effort to detect and track hackers attempting to access restricted portions of the network. Additionally, the systems and methods of this invention help to maintain the privacy of private information since, for example, only information determined about one or more hackers can be forwarded to the appropriate entity such as law enforcement personnel. Thus, the integrity of the underlying data can be maintained.

In conjunction with determining the origin of the hack, a retaliatory action, or counter "hack" can be implemented if such a retaliatory action is launched in real-time or near real-time. Indeed, if a retaliatory action is launched after the original hack has been completed, the retaliatory action must deal with the defensive posture of the original hacking system. On the other hand, a hacker is most vulnerable to a retaliatory action during the unauthorized access attempt, since during the unauthorized access attempt the hacker has to substantially take down the originating system's defensive mechanisms. It is this weakness that allows a defensive system to perform a retaliatory action.

For example, when a decision to retaliate, such as a "counter hack," has been approved by the appropriate entity, such as law enforcement personnel, the retaliatory action could be performed in the following exemplary manner. Similar to the process described above, an executable program could be embedded into a response returned to the hacker. For example, the executable program could be a JAVA® program embedded into an HTML page. However, in general, the information returned to the hacker could be any information that is capable of determining, identifying or obtaining information about the origin of the unauthorized access attempt. The executable program could contain, for example, codes similar to that found in a virus. The triggering mechanism could be, for example, based on one or more levels of verification to ensure the hostile intent of a hacker. For example, a false request for a password can be made while the target system does not employ password-based security features. By entering any password, or otherwise responding to a request, the hacker would have confirmed that they are not familiar with the protocols for the target system and therefore their access to it could be deemed unauthorized. Simultaneously, for example, responding to a password request could trigger the executable program which could, for example, alter the operation of one or more of the hacker's computer(s), query and forward information about the hacker's computers, or the like.

Accordingly, aspects of the present invention relate to a protection system for a portion of a distributed network. In particular, an exemplary embodiment of the invention provides systems and methods for determining the origin of an unauthorized access attempt.

A further aspect of the invention relates to determining an action responsive to an unauthorized access attempt.

An additional aspect of the invention relates to providing a conduit through which a third party can communicate with an entity originating an unauthorized access attempt.

An additional aspect of the invention relates to determining information forwarded to a hacker based on information associated with the intended target.

An additional aspect of the invention relates to providing a communications link between a third party and a hacker while concealing the identity of the third party.

An additional aspect of the invention relates to providing a restricted tunnel between a monitoring center and a hacker while concealing the identity of the monitoring center.

These and other features and advantages of this invention are described in or are apparent from the following detailed description of the embodiments.

BRIEF DESCRIPTION OF THE DRAWINGS

The embodiments of the invention will be described in detail, with reference to the following figures wherein.

DETAILED DESCRIPTION OF THE INVENTION

The systems and methods of this invention, for example, deter unauthorized access attempts, i.e., hacks, by providing a method and infrastructure for determining the origin of the unauthorized access attempt, and having determined the origin, the ability to perform retaliatory actions. For example, an intrusion detection system monitors information flow to one or more portions of a protected network. Upon detection of an unauthorized access attempt, an intrusion detection system can forward information regarding the intrusion attempt to an analysis system. The analysis system can verify that the unauthorized access attempt is a bona fide attempt and, if so, perform a number of tracing and/or retaliatory actions. For example, the analysis system can initiate a tracing procedure where an attempt is made to determine the origin of the unauthorized access attempt. Alternatively, for example, the analysis system can forward information regarding the unauthorized access attempt to, for example, law enforcement personnel. Then, acting as a conduit, the network protection system, according to an exemplary embodiment of the systems and methods of this invention, can act as a conduit allowing the law enforcement personnel to further communicate with the hacker via the targeted system. Thus, from the hacker's perspective, it appears that they are continuing to communicate with the target system, while in actuality, they are communicating with a third party, such as the FBI.

Figure 1:
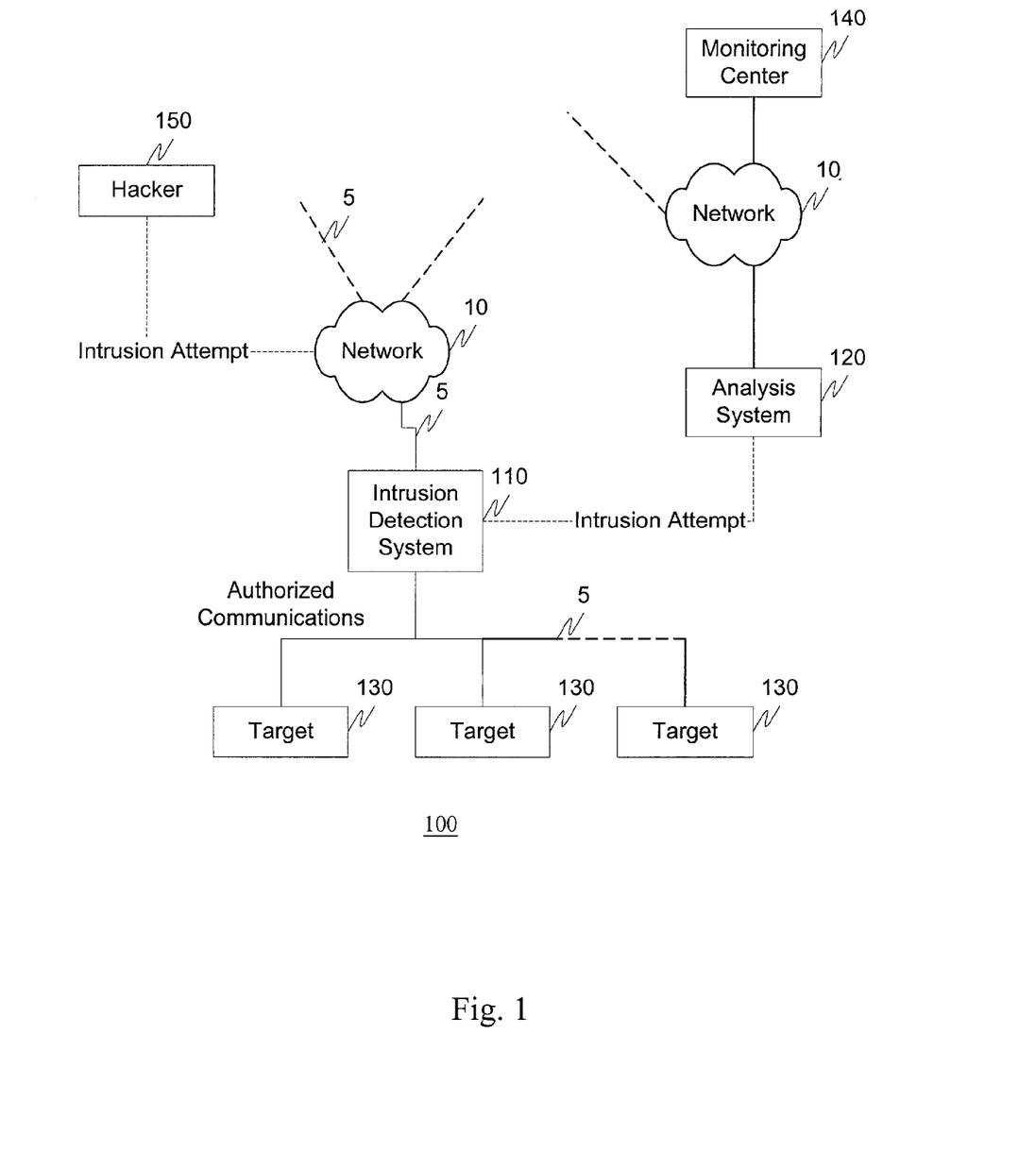
FIG. 1 illustrates an exemplary embodiment of the network protection system according to this invention.

FIG. 1 illustrates an exemplary network protection system 100. The network protection system 100 comprises an intrusion detection system 110, an analysis system 120, one or more targets 130, a monitoring center 140 and one or more hackers 150, all interconnected by one or more networks 10 and links 5. The network protection system 100 can also be connected to one or more other distributed network protection systems and is scalable depending on the particular implementation. Additionally, while the hacker 150 is illustrated as a single entity, it should be appreciated that the hacker 150 can be one or more devices, computers or entities, and can be located at one or more geographic or virtual locations on a distributed network.

Figure 2:
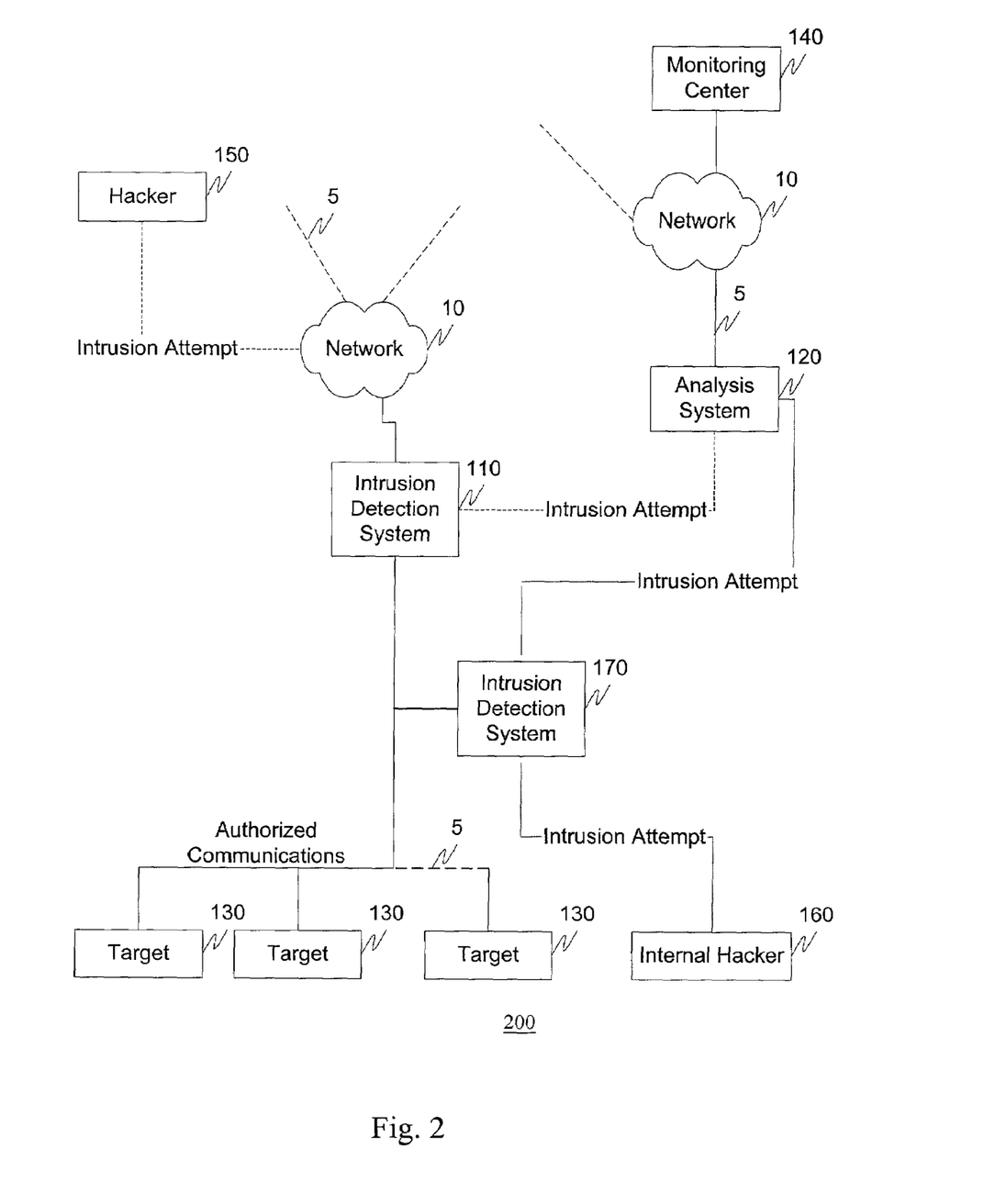
FIG. 2 illustrates a second exemplary embodiment of the network protection system according to this invention.

While the exemplary embodiments illustrated in FIG. 1, and in FIG. 2 below, show the network protection systems 100 and 200 and associated components co-located, it is to be appreciated that the various components of the network protection system can be located at distant portions of a distributed network, such as a local area network, a wide area network, an intranet, and/or the Internet, or within a dedicated network protection system. Thus, it should be appreciated that the components of the network protection system can be combined into one device collocated on a particular node of a distributed network. Furthermore, it should be appreciated that for ease of illustration, that various functional components of the network protection system have been divided as illustrated in FIGS. 1 and 2. However, any of the functional components illustrated in FIGS. 1 or 2 can be combined without affecting the operation of the system. It will be appreciated from the following description, and for reasons of computational efficiency, the components of the network protection system can be arranged at any location within a distributed network without affecting the operation of the system.

Furthermore, the links 5 can be a wired or wireless link or any other known or later developed element(s) that is capable of supplying and communicating electronic data to and from the connected elements.

Additionally, the network protection system can comprise one or more input devices (not shown) that can include, for example, a keyboard, a mouse, a speech to text converter, a stylus or the like. In general, the input device can be any device capable of communicating information to the network protection system. Furthermore, the network protection system can comprise one or more display devices (not shown) such as a computer monitor, a display on a PDA, or any other device capable of displaying information to one or more users.

In operation, the intrusion detection system 110 monitors communications to the one or more potential targets 130. For example, the intrusion detection system 110 can implement the systems and methods described in co-pending Patent Application Ser. No. 09/571,377 entitled "Method of Communications and Communication Network Intrusion Protection Method and Intrusion Attempt Detection System" filed May 15, 2000 and incorporated herein by reference in its entirety. However, in general, the intrusion detection system 110 can use any method of monitoring communications to one or more portions of a protected network for detecting an unauthorized access attempt.

Upon detection of an unauthorized access attempt, for example, by the hacker 150 initiating an intrusion attempt to one or more targets 130, the intrusion detection system 110 forwards information regarding the unauthorized access attempt to the analysis system 120. The analysis system 120 can, optionally, commence logging of all communications with the hacker 150 and determine a responsive action. For example, the analysis system 120 can forward information regarding the unauthorized access attempt to one or more monitoring centers, such as those described in co-pending Ser. No. 09/867,442 as discussed above. Then, for example, based on instructions received from one or more monitoring centers 140, the analysis system 120, in cooperation with the intrusion detection system 110, can engage the hacker 150 in an attempt to determine the origin of the unauthorized access attempt. For example, the analysis system 120, in cooperation with the intrusion detection system 110, can receive one or more of instructions, or other information aimed at communicating with or engaging the hacker 150 in an attempt to determine the location or origin of the unauthorized access attempt. For example, the monitoring center 140 can covertly send information to the analysis system 120 which could, for example, remove the origin information of the monitoring center 140, and forward the information, which would include the origin information of the original target, back to the hacker 150. Thus, to the hacker 150, it would appear as if communications were continuing with the one or more intended targets 130.

FIG. 2 illustrates a second exemplary embodiment of the network protection system. In particular, the system of FIG. 2 includes comparable components to those discussed above, in relation to FIG. 1, and additionally a second intrusion detection system 170 that is capable of monitoring unauthorized access attempts that may occur within the protected network itself. However, while the intrusion detection systems 110 and 170 are shown as separate functional blocks, it is to be appreciated that they can be combined into a single intrusion detection system that is capable of monitoring both internal communications within a protected network as well as communications received from one or more external origins. Specifically, the hacker 160 may be internal to the protected network, such as a disgruntled employee, or other entity that may legitimately have access to other portions of the protected network.

In this exemplary embodiment, upon detection of an unauthorized access attempt from the internal hacker 160, the intrusion detection system 170 can forward information regarding the unauthorized access attempt to the analysis system 120. Similar to the embodiment described above, the analysis system 120 can perform an evaluation of the unauthorized access attempt and determine the validity of the unauthorized access attempt, and whether any retaliatory action need be taken. Since the location of the internal hacker 160 is probably known, the analysis system 120 can make a determination whether the nature of the unauthorized access attempt can be handled internally, or should be forwarded to, for example, the monitoring center 140, such as a law enforcement entity, for further action. Then, comparable to the system described above in conjunction with FIG. 1, the monitoring center 140 could commence communications with the internal hacker 160, via the analysis system 120 and the intrusion detection system 170, such that the internal hacker 160 is unaware that they are communicating with, for example, a law enforcement entity as opposed to one or more of the targets 130.

Figure 3:
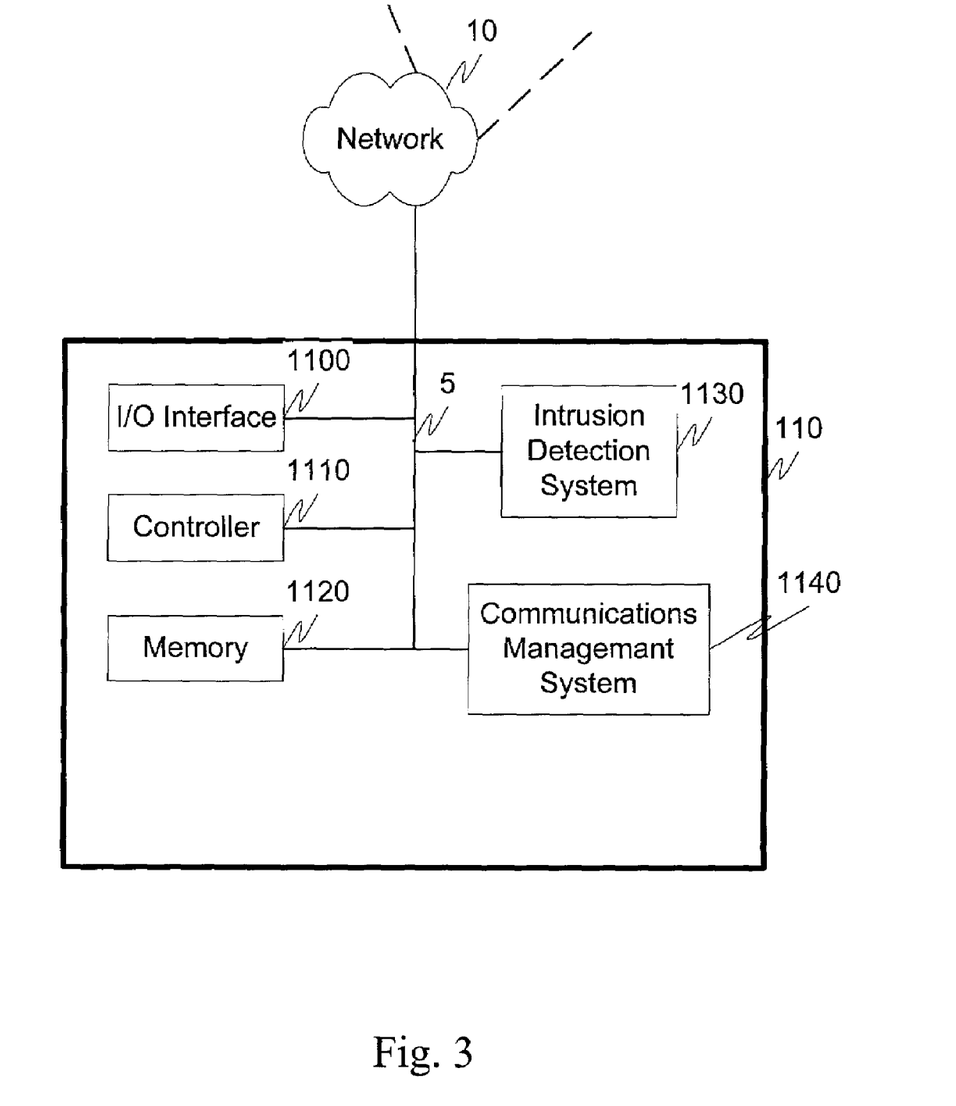
FIG. 3 is a functional block diagram illustrating an exemplary intrusion detection system according to this invention.

FIG. 3 illustrates an exemplary intrusion detection system 110. The intrusion detection system 110 comprises an I/O interface 1100, a controller 1110, a memory 1120, an intrusion detection module 1130, and a communications management system 1140, all interconnected by link 5.

Thus, upon receipt of one or more communications via the network 10 and link 5, the intrusion detection module 1130, in cooperation with the I/O interface 1100, the controller 1110 and the memory 1120 determines the nature of the communication. If the communication is authorized, the intrusion detection system 1130 forwards the communication to its intended destination. However, if the intrusion detection system 1130 determines that the communication is an unauthorized access attempt, or appears to be an unauthorized access attempt, the intrusion detection module 1130, in cooperation with the I/O interface 1100, the controller 1110 and the memory 1120, forwards, with the aid of the communications management system 1140, the apparently unauthorized access attempt to the analysis system 1120.

Additionally, the communications management system 1140 cooperates with the analysis system 1120, as described hereinafter, to facilitate acting as a conduit between the one or more external monitoring centers 140 and a hacker. Thus, communications management system 1140 is capable of forwarding modified information from one or more entities back to the apparent origin of the unauthorized access attempt.

Figure 4:
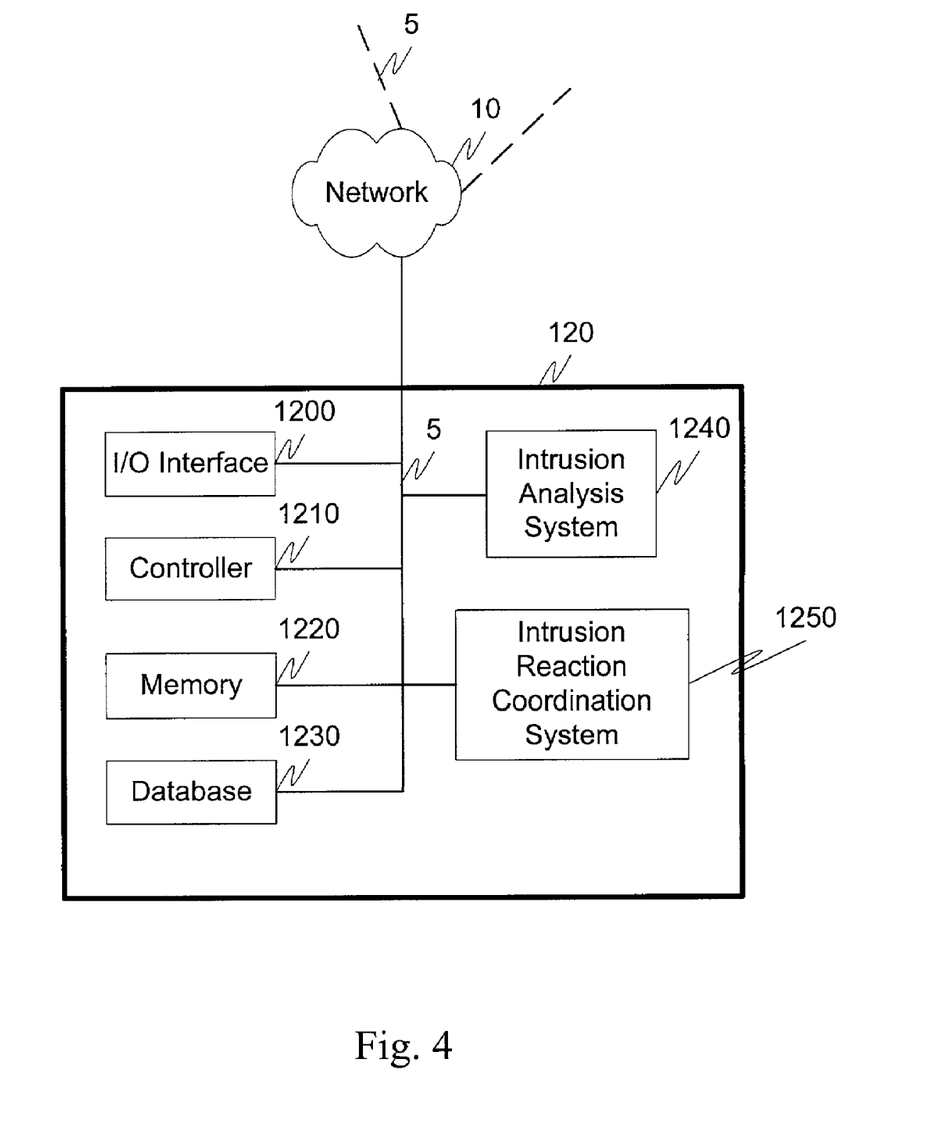
FIG. 4 is a functional block diagram illustrating an exemplary analysis system according to this invention.

FIG. 4 illustrates an exemplary analysis system 120. The analysis system 120 comprises an I/O interface 1200, a controller 1210, a memory 1220, a database 1230, an intrusion analysis module 1240 and an intrusion reaction coordination system 1250, all interconnected by link 5. Additionally, the analysis system 120 can be connected to one or more distributed networks 10 which can, for example, be connected to one or more monitoring centers 140.

In operation, the analysis system 120 receives information forwarded by the intrusion detection system 110 that has been determined to possibly be an unauthorized access attempt. The intrusion analysis system 1240, in cooperation with the I/O interface 1200, the controller 1210, the memory 1220, and optionally using hacker information stored in database 1230, determines the authenticity of the unauthorized access attempt. For example, the database 1230 can contain profiles of information related to one or more hackers, unauthorized access attempt origin information, or in general any information that can aid the intrusion analysis system 1240 in determining the accuracy of the detected unauthorized access attempt. Similarly, the intrusion analysis module 1240 can query database 1230 to determine if perhaps the apparent unauthorized access attempt was simply an error in communications, such as a bit error, which may in actuality be an authorized user of the protected network. If the intrusion analysis system 1240 determines that the access attempt is legitimate, the intrusion analysis system can forward, directly, or for example, via link 5 and network 10, an instruction to the intrusion detection module 1130, with cooperation of the communications management system 1140, that the user is authorized and to forward information from that user to the one or more intended destinations.

Alternatively, if the intrusion analysis module 1240 determines, based on, for example, historical profiles, previous unauthorized access attempts, or the like, that the access attempt is unauthorized, the intrusion analysis module 1240 cooperates with the intrusion reaction coordination system 1250 to determine an appropriate response and/or retaliatory action. For example, based on the number of previous unauthorized access attempts from this hacker, the nature of the unauthorized access attempt, such as destructiveness of the received packets, or the like, the intrusion reaction coordination system can determine whether forwarding information about the unauthorized access attempt to an outside entity, such as the monitoring center 140 is required. For example, an analysis can be performed that weighs the information received by the intrusion detection system, historical information, source or destination port and/or IP address information, information received from, for example, a central repository that catalogs information related to unauthorized access attempts from one or more other protected networks, or the like, to determine whether a reaction is needed. For example, the analysis can be based on a look-up table, a neural network analysis, a predetermined event sequence or the like. In general, any method can be used to determine a responsive action based on the verification that the access attempt was unauthorized.

If it is determined that a responsive or retaliatory action is not required, the intrusion reaction coordination system 1250, in cooperation with the I/O interface 1200, the controller 1210, the memory 1220, and directly, or for example,via link 5 and the network 10, can simply instruct the intrusion detection system 110 to simply block communications from that originating address(es) and/or communications that match one or more characteristics of the unauthorized access attempt. The intrusion reaction coordination system 1250 could optionally log information regarding the unauthorized access attempt to the database 1230 that can be used, for example, in the future, against a hack from the same entity. Furthermore, this information on an attempted access attempt can be forwarded to one or more other network protection systems or, for example, to one or more monitoring centers.

Alternatively, if the intrusion reaction coordination system 1250 determines that the nature of the unauthorized access attempt requires third party intervention, the intrusion reaction coordination system 1250, directly, or for example, via links 5 and network 10, can communicate with one or more monitoring centers 140, for example, by forwarding an alarm indicating an unauthorized access attempt has been received.

Then, for example, the intrusion reaction coordination system 1250 can coordinate with the monitoring center 140 to determine an appropriate retaliatory or responsive action. For example, as discussed above, the monitoring center 140 may desire to engage or further communicate with the hacker 150 to, for example, build a stronger legal case against that entity. In this instance, the monitoring center 140, cooperates with the analysis system 120 and the intrusion detection system 110 such that the analysis system 120 and intrusion detection system 110 act as a conduit for information forwarded from the monitoring center 140. For example, the analysis system 120 and the intrusion detection system 110 can strip away origin information, such as an IP address or the like, from the core information that was forwarded from the monitoring center 140 that is intended to communicate with or otherwise engage the hacker. This core information is then forwarded back to the hacker 150 including the origin address of the protected network, or, for example, the address of the target for which the unauthorized access attempt was directed. For example, the network protection system can store information about which address the unauthorized access attempt was directed toward that can be used for the reactionary and/or retaliatory response. Thus, the hacker 150 is under the impression that they are still communicating with the protected network. In this exemplary embodiment, the intrusion detection system 110 and the analysis system 120 act as a conduit for the monitoring center 140. Nevertheless, it is to be appreciated that the communications between the protected network and the one or more monitoring centers 140 can occur over a wired or wireless network, a secure network, such as a private network, a direct connection, or could include standard protection techniques such as encryption, secure tunneling, or the like.

For example, upon receipt of a communication from, for example, the monitoring center 140, the intrusion detection system 110 and the analysis system 120 can analyze the communication, determine the source information, such as header information, and remove that information from the communication leaving the core information. The address information, such as header information, can be stored so that in the event communications with the hacker commence, such as a response to a password request, upon receipt of the response information from the hacker, the response information can be forwarded by the intrusion detection system 110 and the analysis system 120 to the appropriate destination, such as the monitoring center 140.

Thus, the intrusion detection system 110 and the analysis system 120 can work equally well in concealing the identity of one or more third parties, such as the monitoring center(s) 140, from either an unauthorized access attempt originating from within, or external to, the protected network. Furthermore, since the intrusion detection system 110 and the analysis system 120 are regulating the information passed to the one or more third parties, the underlying content can be screened and, for example, sensitive information removed from the forwarded information thus, for example, preserving the confidentiality of the underlying content. For example, a policy file can regulate the screening and removing of sensitive information such that, for example, all "content" or core information is removed or, for example, content having certain words, or originating from a predetermined location is screened and/or modified.

Additionally, the intrusion detection system 110 and the analysis system 120 can cooperate with the monitoring centers 140 to aid in unauthorized access attempt detection. For example, the monitoring center(s) 140 can forward information regarding hackers to the intrusion detection system 110 and the analysis system 120. Thus, similar to a virus detection program that analyzes files for viruses, the intrusion detection system 110 and the analysis system 120 can analyze access attempts to determine if they match a profile corresponding to one or more known hackers or have characteristics that correspond to one or more known hackers. Furthermore, upon detection of an unauthorized access attempt, the intrusion detection system 110 and the analysis system 120 can forward information to the monitoring center 140 such that, for example, a central database that maintains hacker information can be updated.

Figure 5:
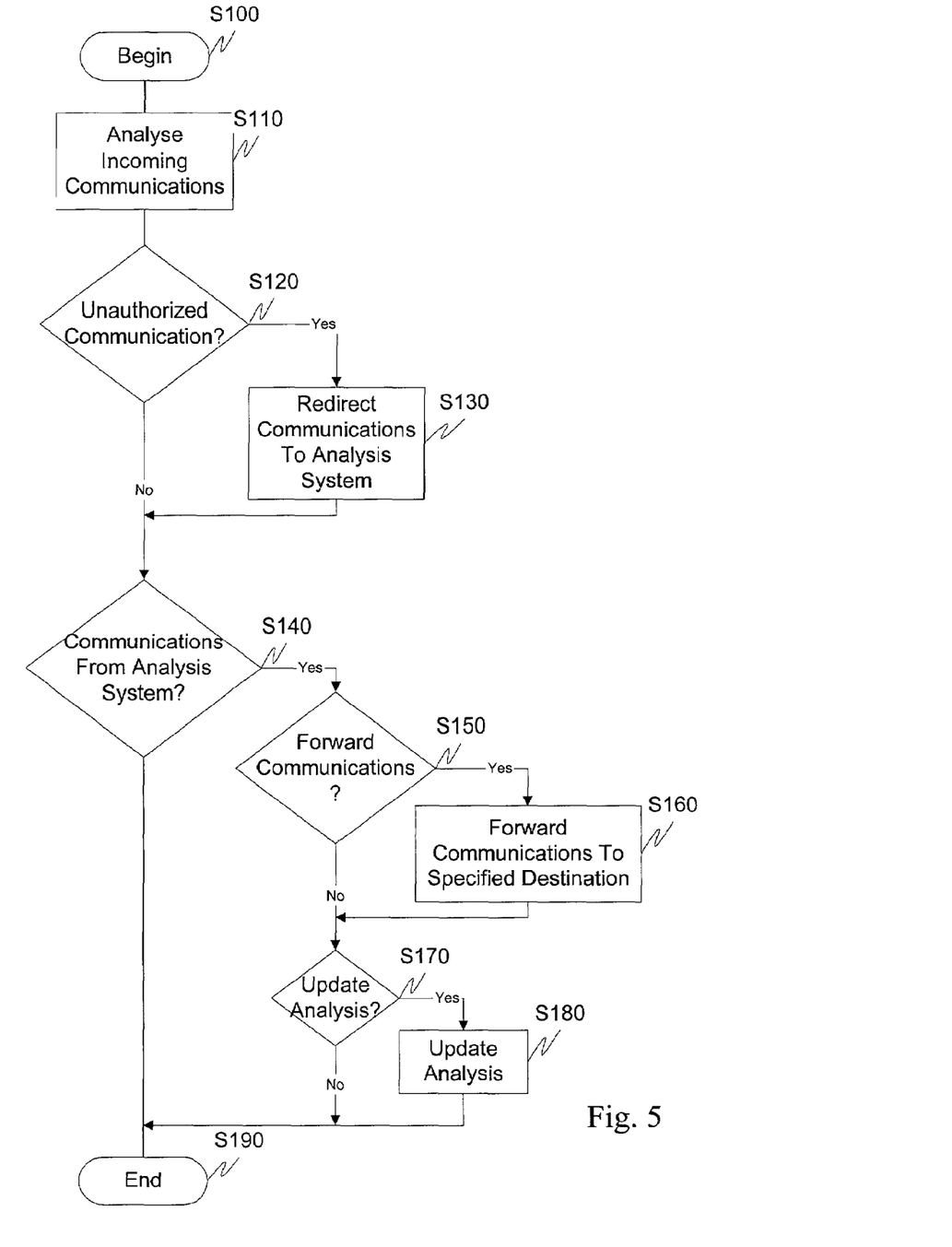
FIG. 5 is a flowchart outlining an exemplary method of protecting a distributed network according to this invention.

FIG. 5 illustrates an exemplary method of the operation of an intrusion detection system. In particular, control begins in step S100 and continues to step S110. In step S110, incoming communications are analyzed. Next, in step S120, a determination is made whether the incoming communications are unauthorized. If the incoming communications are unauthorized, control continues to step S130. Otherwise, control jumps to step S140.

In step S130, the unauthorized communications are redirected to an analysis system. Control then continues to step S140.

In step S140 a determination is made whether the incoming communication has been received from the analysis system. If the incoming communication has been received from the analysis system, control continues to step S150. Otherwise, control jumps to step S190 where the control sequence ends.

In step S150, a determination is made whether the communication is to be forwarded to one or more particular addresses. If the communication from the analysis system is to be forwarded, control continues to step S160. Otherwise, control jumps to step S170.

In step S160, communications are forwarded to the one or more specified destinations and/or modified and forwarded to appear as if the communication is origination from a particular destination. Control then continues to step S170.

In step S170, a determination is made as to whether the operation of the intrusion detection system is to be updated. If the operation is to be updated, control continues to step S180. Otherwise, control jumps to step S190, where the control sequence ends.

In step S180, the operation of the intrusion detection system can be updated, for example, by modifying the techniques used to detect unauthorized access, by reconfiguring traffic management, blocking all or a portion of incoming traffic, for example, from one or more addresses, or the like. Control then continues to step S190.

Figure 6:
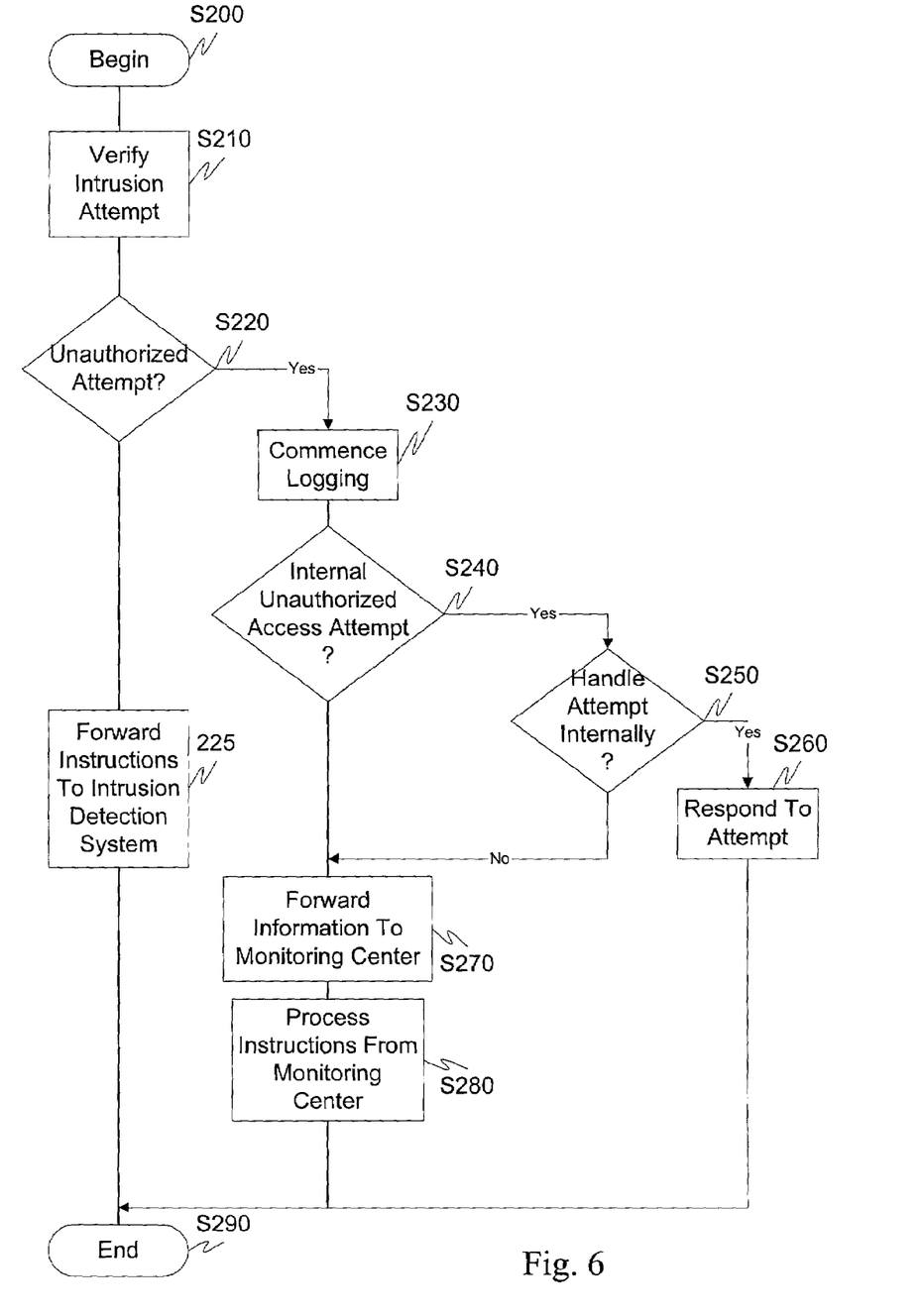
FIG. 6 is a flowchart outlining a second exemplary method for protecting a distributed network according to this invention.

FIG. 6 illustrates an exemplary method of the operation of an analysis system. In particular, control begins in step S200 and continues to step S210. In step S210, an attempt is made to verify that the unauthorized access attempt is in fact unauthorized. Next, in step S220, if the access attempt is unauthorized, control continues to step S230. Otherwise, control jumps to step S225 where instructions can be forwarded to the intrusion detection system. Control then continues to step S290 where the control sequence ends.

In step S230, logging of all communications with the protected network can optionally begin. Then, in step S240 a determination is made whether the unauthorized access attempt is originating from within the protected network. If the unauthorized access attempt is originating from within the protected network, control continues to step S250. Otherwise, control jumps to step S270.

In step S250, a determination is made whether the internal unauthorized access attempt will be handled internally to the protected network. If the internal unauthorized access attempt will be handled internally, control continues to step S260. Otherwise, control jumps to step S270.

In step S260, a response to the internal unauthorized access attempt is initiated. For example, the offending employee can be reprimanded, or the like. Control then continues to step S290.

In step S270, information regarding the unauthorized access attempt is forwarded to one or more information centers. Then, in step S280, instructions received from the one or more monitoring centers are processed and implemented. Control then continues to step S290 where the control sequence ends.

As illustrated in FIGS. 1-4, the network protection system can be implemented either on a single programmed general purpose computer or a separate programmed general purpose computer. However, the network protection system can also be implemented on a special purpose computer, a programmed microprocessor or microcontroller and peripheral integrated circuit element, an ASIC or other integrated circuit, a digital signal processor, a hardwired electronic or logic circuit, such as a discrete element circuit, a programmable logic device such as a PLD, PLA, FPGA, PAL, or the like. In general, any device capable of implementing a finite state machine that is in turn capable of implementing the flowcharts in FIGS. 5-6 can be used to implement the network protection system according to this invention.

Furthermore, the disclosed method may be readily implemented in software using object or object-oriented software development environments that provide portable source code that can be used on a variety of computer or workstation hardware platforms. Alternatively, the disclosed distributed network protection system may be implemented partially or fully in hardware using standard logic circuits or VLSI design. Whether hardware or software is used to implement the systems and methods in accordance with this invention is dependent on the speed and/or efficiency requirements of the system, the particular function, and the particular software and/or hardware systems or microprocessor or microcomputer systems being utilized. The network protection system illustrated herein, however, can be readily implemented in hardware and/or software using any known or later-developed systems or structures, devices and/or software by those of ordinary skill in the applicable art from the functional description provided herein and with a general basic knowledge of the computer arts.

Moreover, the disclosed methods may be readily implemented as software executed on a programmed general purpose computer, a special purpose computer, a microprocessor or the like. In these instances, the methods and systems of this invention can be implemented as a program embedded in a personal computer, a piece of executable code, or the like, such as a Java® or CGI script, as an cookie, as a resource residing on a server or graphics workstation, as a routine embedded in a dedicated network protection system, or the like. The network protection system can also be implemented by physically incorporating the systems and methods into a hardware and/or software system, such as the hardware and software systems of a computer or dedicated network protection system.

It is, therefore, apparent that there has been provided in accordance with the present invention, systems and methods for network protection. While this invention has been described in conjunction with a number of embodiments, it is evident that many alternatives, modifications and variations would be or are apparent to those of ordinary skill in the applicable art. Accordingly, applicants intend to embrace all such alternatives, modifications, equivalents and variations that are within the spirit and the scope of this invention.

What is claimed is:

1. A system for protecting a distributed network from unauthorized access, the system comprising:
   first and second intrusion detection systems, respectively including:
   first and second intrusion detection modules, and
   first and second communications management modules respectively coupled to the first and second intrusion detection modules; and
   an intrusion analysis system coupled to the first and second intrusion detection systems, and including:
   an intrusion analysis module, and
   an intrusion reaction coordination module coupled to the intrusion analysis module,
   wherein the first intrusion detection module detects a respective possible unauthorized access attempt into a distributed network being protected,
   the second intrusion detection module detects a respective possible unauthorized access attempt within the distributed network being protected,
   the first and second communications management modules are coupled to the intrusion analysis module and forward to the intrusion analysis module respective information regarding the respective detected possible unauthorized access attempt,
   the intrusion analysis module determines based on the respective information regarding the respective detected possible unauthorized access attempt whether or not the respective detected possible unauthorized access attempt is authorized,
   if the intrusion analysis module determines that the respective detected possible unauthorized access attempt is authorized, the intrusion analysis module respectively forwards, via the first and second communications management modules, respective information to the first and second intrusion detection modules that the respective possible unauthorized access attempt is authorized, and
   if the intrusion analysis module determines that the respective detected possible unauthorized access attempt is not authorized, the intrusion analysis module determines, via the intrusion reaction coordination module, appropriate actions, including (i) forwarding respective information regarding the respective detected unauthorized access attempt into the distributed network being protected to a monitoring center external to the distributed network being protected, and processing respective information from the monitoring center regarding the respective detected unauthorized access attempt into the distributed network being protected, (ii) forwarding respective information regarding the respective detected unauthorized access attempt within the distributed network being protected for handling internally within the distributed network being protected, and processing respective information for internally handling the respective detected unauthorized access attempt within the distributed network being protected, and (iii) forwarding respective information regarding the respective detected unauthorized access attempt within the distributed network being protected to the monitoring center external to the distributed network being protected, and processing respective information from the monitoring center regarding the respective detected unauthorized access attempt within the distributed network being protected,
   wherein the intrusion analysis system in cooperation with the first and second intrusion detection systems enable communications between the monitoring center and an entity attempting the respective unauthorized access attempt without the entity being made aware that the entity attempting the respective unauthorized access attempt is communicating with the monitoring center,
   wherein the monitoring center sends information to the analysis system and intended for the entity attempting the unauthorized access attempt, the analysis system substitutes origin information of the monitoring center from the received information with origin information of a target of the respective unauthorized access attempt and forwards the substituted information to the entity attempting the respective unauthorized access attempt, whereby it appears to the entity attempting the respective unauthorized access attempt that communications are continuing with the target of the respective unauthorized access attempt, and
   wherein the intrusion analysis system in cooperation with the first intrusion detection system engages the entity attempting the respective unauthorized access attempt to determine the location or origin of the entity attempting the respective unauthorized access attempt.

2. The system of claim 1, wherein the intrusion analysis system communicates with monitoring center via a secure tunnel.

3. The system of claim 1, wherein the respective communications from the monitoring center to the entity attempting the respective unauthorized access attempt are modified, via the intrusion analysis system and the respective first and second intrusion detection systems, to appear as if the communications originate from the distributed network being protected.

4. The system of claim 1, wherein the intrusion analysis system logs respective information regarding communications with the entity attempting the respective unauthorized access attempt.

5. The system of claim 1, wherein the first and second intrusion detection modules respectively detect whether or not the respective possible unauthorized access attempt into or within the distributed network being protected is internal or external to the network being protected.

6. The system of claim 1, wherein if second intrusion detection module detects that the possible respective unauthorized access attempt is internal to the network being protected, the second intrusion detection module forwards via the second communications management module respective information regarding the possible internal unauthorized access attempt to the intrusion analysis module, and the intrusion analysis module evaluates the received information and if the intrusion analysis module determines that the possible internal unauthorized access attempt is not authorized, the intrusion analysis module determines whether or not a retaliatory action should be taken, including handling the unauthorized access attempt internally or providing information to the monitoring center regarding the unauthorized access attempt.

7. The system of claim 1, wherein the monitoring center comprises a law enforcement entity.

8. The system of claim 1, further comprising a database,
wherein the intrusion analysis module employs the database, including respective information regarding previous respective unauthorized access attempts, to determine whether or not the respective detected possible unauthorized access attempt is authorized.

9. The system of claim 8, wherein the database includes respective profiles of information related to one or more entities associated with the respective previous unauthorized access attempts, including origin information regarding the respective previous unauthorized access attempts.

10. The system of claim 8, wherein the intrusion analysis module is configured to query the database to determine whether or not the respective possible unauthorized access attempt is an error in communications, including a bit error.

11. The system of claim 1, wherein the intrusion analysis module is configured to determine based on respective historical profiles, and respective previous unauthorized access attempts whether or not the detected respective possible unauthorized access attempt is authorized.

12. The system of claim 1, wherein the intrusion reaction coordination module determines the respective appropriate actions based on a number of respective previous unauthorized access attempts, and a nature of the respective unauthorized access attempt, including destructiveness of packets received during the respective unauthorized access attempt.

13. The system of claim 1, wherein the intrusion reaction coordination module, to determine the respective appropriate actions, analyzes the respective information received by the first and second intrusion detection modules, respective historical information regarding respective unauthorized access attempts, respective source and destination ports of respective unauthorized access attempts, respective IP address information of respective unauthorized access attempts, and respective information received from a central repository that catalogs respective information related to respective unauthorized access attempts from one or more other protected networks.

14. The system of claim 13, wherein the intrusion detection analysis is based on at least one of a look-up table, a neural network analysis, and a predetermined event sequence.

15. The system of claim 1, wherein if the intrusion reaction coordination module determines that a responsive or retaliatory action is not required, the intrusion reaction coordination module respectively instructs the first and second intrusion detection modules to block communications from an entity attempting the respective unauthorized access attempt.

16. The system of claim 1, wherein if the intrusion reaction coordination module determines that a responsive or retaliatory action is not required, the intrusion reaction coordination module respectively instructs the first and second intrusion detection modules to block communications from an entity that matches one or more characteristics of the respective unauthorized access attempt.

17. The system of claim 8, wherein the intrusion reaction coordination module logs respective information regarding an entity attempting the respective unauthorized access attempt to the database for use in a future unauthorized access attempt by the entity.

18. The system of claim 1, wherein the intrusion analysis module is configured to store information regarding an address to which the respective unauthorized access attempt was directed for use by the intrusion reaction coordination module to determine the respective appropriate actions.

19. The system of claim 8, wherein upon receipt of a respective communication from the monitoring center, the first and second intrusion detection systems in cooperation with the intrusion analysis system analyze the respective communication, determine address information of a source of the respective communication from the monitoring center, and remove the address information from the respective communication from the monitoring center leaving the remaining information for further analysis.

20. The system of claim 19, wherein the address information of the source of the communication from the monitoring center is stored in the database, and the intrusion analysis module is configured to use the address information to communicate information to the monitoring center, including information regarding a response to a password request by an entity attempting the unauthorized access attempt.

21. The system of claim 1, wherein the first and second intrusion detection systems in cooperation with the intrusion analysis system conceal an identity of the monitoring center, communicate respective information with the monitoring center, and screen respective underlying content in the communicated information, including removing sensitive information from the communicated information.

22. The system of claim 21, wherein the first and second intrusion detection systems in cooperation with the intrusion analysis system employ a policy file to regulate the screening and removing of the sensitive information, including removing all content or core information, removing content having certain words, and removing content originating from a predetermined location.

23. The system of claim 1, wherein the first and second intrusion detection systems and the intrusion analysis system cooperate with the monitoring center to aid in detecting a source of the respective unauthorized access attempt.

24. The system of claim 23, wherein the first and second intrusion detection systems in cooperation with the intrusion analysis system receive from the monitoring center respective information regarding unauthorized accesses or access attempts into or within distributed networks.

25. The system of claim 24, wherein the first and second intrusion detection systems in cooperation with the intrusion analysis system analyze the respective information regarding unauthorized accesses or access attempts into or within the distributed networks received from the monitoring center to determine if the respective received information matches a profile or has characteristics corresponding to one or more respective known unauthorized access attempts.

26. The system of claim 25, wherein, upon detection of an unauthorized access attempt, the first and second intrusion detection systems in cooperation with the intrusion analysis system forward information regarding the respective unauthorized access attempt to the monitoring center for inclusion in a central database that maintains the information regarding the respective unauthorized accesses or access attempts into or within the distributed networks.

27. The system of claim 1, wherein the system is implemented with one or more hardware and or software components.

28. A method for protecting a distributed network from unauthorized access for use in a system including first and second intrusion detection systems respectively having first and second intrusion detection modules, and first and second communications management modules coupled to the first and second intrusion detection modules, and intrusion analysis system coupled to the first and second intrusion detection systems, and including an intrusion analysis module, and an intrusion reaction coordination module coupled to the intrusion analysis module, the method comprising:

detecting, by the first intrusion detection module, a respective possible unauthorized access attempt into a distributed network being protected;

detecting, by the second intrusion detection module, a respective possible unauthorized access attempt within the distributed network being protected;

forwarding, by the first and second communications management modules, respective information regarding the respective detected possible unauthorized access attempt to the intrusion analysis module;

determining, by the intrusion analysis module, based on the respective information regarding the respective detected possible unauthorized access attempt whether or not the respective detected possible unauthorized access attempt is authorized;

if the intrusion analysis module determines that the respective detected possible unauthorized access attempt is authorized, respectively forwarding, by the intrusion analysis module, via the first and second communications management, respective information to the first and second intrusion detection modules that the respective possible unauthorized access attempt is authorized, and if the intrusion analysis module determines that the respective detected possible unauthorized access attempt is not authorized, determining, by the intrusion analysis module, via the intrusion reaction coordination module, appropriate actions, including (i) forwarding respective information regarding the respective detected unauthorized access attempt into the distributed network being protected to a monitoring center external to the distributed network being protected, and processing respective information from the monitoring center regarding the respective detected unauthorized access attempt into the distributed network being protected, (ii) forwarding respective information regarding the respective detected unauthorized access attempt within the distributed network being protected for handling internally within the distributed network being protected, and processing respective information for internally handling the respective detected unauthorized access attempt within the distributed network being protected, and (iii) forwarding respective information regarding the respective detected unauthorized access attempt within the distributed network being protected to the monitoring center external to the distributed network being protected. and processing respective information from the monitoring center regarding the respective detected unauthorized access attempt within the distributed network being protected, wherein the intrusion analysis system in cooperation with the first and second intrusion detection systems enable communications between the monitoring center and an entity attempting the respective unauthorized access attempt without the entity being made aware that the entity attempting the respective unauthorized access attempt is communicating with the monitoring center, wherein the monitoring center sends information to the analysis system and intended for the entity attempting the unauthorized access attempt, the analysis system substitutes origin information of the monitoring center from the received information with origin information of a target of the respective unauthorized access attempt and forwards the substituted information to the entity attempting the respective unauthorized access attempt, whereby it appears to the entity attempting the respective unauthorized access attempt that communications are continuing with the target of the respective unauthorized access attempt, and wherein the intrusion analysis system in cooperation with the first intrusion detection system engages the entity attempting the respective unauthorized access attempt to determine the location or origin of the entity attempting the respective unauthorized access attempt.

29. The method of claim 28, wherein the intrusion analysis system communicates with monitoring center via a secure tunnel.

30. The method of claim 28, wherein the respective communications from the monitoring center to the entity attempting the respective unauthorized access attempt are modified, via the intrusion analysis system and the respective first and second intrusion detection systems, to appear as if the communications originate from the distributed network being protected.

31. The method of claim 28, wherein the intrusion analysis system logs respective information regarding communications with the entity attempting the respective unauthorized access attempt.

32. The method of claim 28, wherein the first and second intrusion detection modules respectively detect whether or not the respective possible unauthorized access attempt into or within the distributed network being protected is internal or external to the network being protected.

33. The method of claim 28, wherein if second intrusion detection module detects that the possible respective unauthorized access attempt is internal to the network being protected, the second intrusion detection module forwards via the second communications management module respective information regarding the possible internal unauthorized access attempt to the intrusion analysis module, and the intrusion analysis module evaluates the received information and if the intrusion analysis module determines that the possible internal unauthorized access attempt is not authorized, the intrusion analysis module determines whether or not a retaliatory action should be taken, including handling the unauthorized access attempt internally or providing information to the monitoring center regarding the unauthorized access attempt.

34. The method of claim 28, wherein the monitoring center comprises a law enforcement entity.

35. The method of claim 28, the system further comprising a database, wherein the intrusion analysis module employs the database, including respective information regarding previous respective unauthorized access attempts, to determine whether or not the respective detected possible unauthorized access attempt is authorized.

36. The method of claim 35, wherein the database includes respective profiles of information related to one or more entities associated with the respective previous unauthorized access attempts, including origin information regarding the respective previous unauthorized access attempts.

37. The method of claim 35, wherein the intrusion analysis module is configured to query the database to determine whether or not the respective possible unauthorized access attempt is an error in communications, including a bit error.

38. The method of claim 28, wherein the intrusion analysis module is configured to determine based on respective historical profiles, and respective previous unauthorized access attempts whether or not the detected respective possible unauthorized access attempt is authorized.

39. The method of claim 28, The system of claim 31, wherein the intrusion reaction coordination module determines the respective appropriate actions based on a number of respective previous unauthorized access attempts, and a nature of the respective unauthorized access attempt, including destructiveness of packets received during the respective unauthorized access attempt.

40. The method of claim 28, wherein the intrusion reaction coordination module, to determine the respective appropriate actions, analyzes the respective information received by the first and second intrusion detection modules, respective historical information regarding respective unauthorized access attempts, respective source and destination ports of respective unauthorized access attempts, respective IP address information of respective unauthorized access attempts, and respective information received from a central repository that catalogs respective information related to respective unauthorized access attempts from one or more other protected networks.

41. The method of claim 40, wherein the intrusion detection analysis is based on at least one of a look-up table, a neural network analysis, and a predetermined event sequence.

42. The method of claim 28, wherein if the intrusion reaction coordination module determines that a responsive or retaliatory action is not required, the intrusion reaction coordination module respectively instructs the first and second intrusion detection modules to block communications from an entity attempting the respective unauthorized access attempt.

43. The method of claim 28, wherein if the intrusion reaction coordination module determines that a responsive or retaliatory action is not required, the intrusion reaction coordination module respectively instructs the first and second intrusion detection modules to block communications from an entity that matches one or more characteristics of the respective unauthorized access attempt.

44. The method of claim 35, wherein the intrusion reaction coordination module logs respective information regarding an entity attempting the respective unauthorized access attempt to the database for use in a future unauthorized access attempt by the entity.

45. The method of claim 28, wherein the intrusion analysis module is configured to store information regarding an address to which the respective unauthorized access attempt was directed for use by the intrusion reaction coordination module to determine the respective appropriate actions.

46. The method of claim 35, wherein upon receipt of a respective communication from the monitoring center, the first and second intrusion detection systems in cooperation with the intrusion analysis system analyze the respective communication, determine address information of a source of the respective communication from the monitoring center, and remove the address information from the respective communication from the monitoring center leaving the remaining information for further analysis.

47. The method of claim 46, wherein the address information of the source of the communication from the monitoring center is stored in the database, and the intrusion analysis module is configured to use the address information to communicate information to the monitoring center, including information regarding a response to a password request by an entity attempting the unauthorized access attempt.

48. The method of claim 28, wherein the first and second intrusion detection systems in cooperation with the intrusion analysis system conceal an identity of the monitoring center, communicate respective information with the monitoring center, and screen respective underlying content in the communicated information, including removing sensitive information from the communicated information.

49. The method of claim 48, wherein the first and second intrusion detection systems in cooperation with the intrusion analysis system employ a policy file to regulate the screening and removing of the sensitive information, including removing all content or core information, removing content having certain words, and removing content originating from a predetermined location.

50. The method of claim 28, wherein the first and second intrusion detection systems and the intrusion analysis system cooperate with the monitoring center to aid in detecting a source of the respective unauthorized access attempt.

51. The method of claim 50, wherein the first and second intrusion detection systems in cooperation with the intrusion analysis system receive from the monitoring center respective information regarding unauthorized accesses or access attempts into or within distributed networks.

52. The method of claim 51, wherein the first and second intrusion detection systems in cooperation with the intrusion analysis system analyze the respective information regarding unauthorized accesses or access attempts into or within the distributed networks received from the monitoring center to determine if the respective received information matches a profile or has characteristics corresponding to one or more respective known unauthorized access attempts.

53. The method of claim 52, wherein, upon detection of an unauthorized access attempt, the first and second intrusion detection systems in cooperation with the intrusion analysis system forward information regarding the respective unauthorized access attempt to the monitoring center for inclusion in a central database that maintains the information regarding the respective unauthorized accesses or access attempts into or within the distributed networks.

54. The method of claim 28, wherein said method is implemented with one or more hardware and/or software devices configured to perform the steps of the method.

55. The method of claim 28, wherein said method is implemented with one or more computer readable instructions embedded on a computer readable medium and configured to cause one or more computer processors to perform the steps of the method.

* * * * *